United States Patent
Shim et al.

(10) Patent No.: US 8,339,582 B2
(45) Date of Patent: Dec. 25, 2012

(54) APPARATUS AND METHOD TO CORRECT IMAGE

(75) Inventors: Hyun Jung Shim, Seoul (KR); Jae Young Sim, Suwon-si (KR); Do Kyoon Kim, Seongnam-si (KR); Jeong Hwan Ahn, Suwon-si (KR); Alexander Hornung, Zurich (CH); Markus Gross, Zurich (CH); Rolf Adelsberger, Zurich (CH)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/926,370

(22) Filed: Nov. 12, 2010

(65) Prior Publication Data

US 2011/0310376 A1 Dec. 22, 2011

(30) Foreign Application Priority Data

Nov. 13, 2009 (KR) .................. 10-2009-0109769

(51) Int. Cl.
*G01B 11/26* (2006.01)

(52) U.S. Cl. ...... 356/4.07; 356/3.01; 356/3.1; 356/4.01; 356/4.1

(58) Field of Classification Search .................. 356/4.07, 356/4.01, 4.03; 382/141
See application file for complete search history.

(56) References Cited

U.S. PATENT DOCUMENTS

| | | | | |
|---|---|---|---|---|
| 5,878,152 A | * | 3/1999 | Sussman | 382/106 |
| 6,054,969 A | * | 4/2000 | Haisma | 345/7 |
| 6,157,677 A | * | 12/2000 | Martens et al. | 375/240.16 |
| 7,657,080 B2 | * | 2/2010 | Allman et al. | 382/154 |
| 2003/0202691 A1 | | 10/2003 | Beardsley | |
| 2004/0165196 A1 | * | 8/2004 | Ono | 356/614 |
| 2006/0221250 A1 | | 10/2006 | Rossbach et al. | |
| 2006/0228050 A1 | | 10/2006 | Xu et al. | |
| 2007/0183647 A1 | * | 8/2007 | Allman et al. | 382/154 |
| 2008/0007709 A1 | | 1/2008 | Bamji et al. | |
| 2009/0115995 A1 | | 5/2009 | Bamji et al. | |
| 2010/0069750 A1 | * | 3/2010 | Masumura | 600/437 |
| 2011/0211045 A1 | * | 9/2011 | Bollano et al. | 348/46 |
| 2011/0254923 A1 | * | 10/2011 | Choi et al. | 348/46 |

FOREIGN PATENT DOCUMENTS

| | | |
|---|---|---|
| JP | 10-047920 | 2/1998 |
| JP | 2002-520968 | 7/2002 |
| JP | 2004-127239 | 4/2004 |
| JP | 2007-526453 | 9/2007 |
| KR | 10-2008-0102826 | 11/2008 |
| KR | 10-2009-0065101 | 6/2009 |
| KR | 10-2009-0067547 | 6/2009 |
| WO | WO 00/04492 | 1/2000 |
| WO | WO 2005/072358 | 8/2005 |

* cited by examiner

*Primary Examiner* — Luke Ratcliffe (74) *Attorney, Agent, or Firm* — Staas & Halsey LLP

(57) ABSTRACT

An apparatus and method of correcting an image are provided. The apparatus includes a receiver to receive a depth value and a luminous intensity, the depth value and the luminous intensity being measured by at least one depth sensor, and a correction unit to read a correction depth value of a plurality of correction depth values mapped to different depth values and different luminous intensities from a first storage unit and to correct the measured depth value using the read correction depth value, the correction depth value being mapped to the measured depth value and the measured luminous intensity.

16 Claims, 9 Drawing Sheets

APPARATUS AND METHOD TO CORRECT IMAGE

CROSS-REFERENCE TO RELATED APPLICATIONS

This application claims the benefit of Korean Patent Application No. 10-2009-0109769, filed on Nov. 13, 2009, in the Korean Intellectual Property Office, the disclosure of which is incorporated herein by reference.

BACKGROUND

1. Field

Example embodiments of the following description relate to a method and apparatus to correct an image that may correct distortion of a depth value occurring due to a measured distance and a measured luminous intensity.

2. Description of the Related Art

A depth camera may measure Time Of Flight (TOF) information and calculate a distance to an object to acquire a depth image. TOF information refers to information of a measurement of an amount of time taken for a light emitted from a camera to be reflected from an object and returned to a sensor of the camera. In other words, the depth camera may calculate a distance to the object based on the TOF information and the speed of light, thereby obtaining a depth image.

However, the depth camera may measure a depth based on the TOF information, and thus a distortion of the measured depth value may occur due to the measured distance between the object and the depth camera, and an intensity of a reflected light. Thus, there is a demand for technologies to correct a distortion that occurs when modeling the TOF information measured by the depth camera to three-dimensional (3D) information.

SUMMARY

The foregoing and/or other aspects are achieved by providing an apparatus to correct an image, the apparatus including a receiver to receive a depth value and a luminous intensity, the depth value and the luminous intensity being measured by at least one depth sensor, and a correction unit to read a correction depth value of a plurality of correction depth values mapped to different depth values and different luminous intensities from a first storage unit and to correct the measured depth value using the read correction depth value, the correction depth value being mapped to the measured depth value and the measured luminous intensity.

The correction unit may identify a correction depth value among the stored correction depth values, and may replace the measured depth value with the identified correction depth value. Here, the identified correction depth value may be simultaneously mapped to the measured depth value and the measured luminous intensity.

The correction depth values may be generated based on a measurement error, which is a difference between an actual depth value of a reference color and a measured depth value of the reference color.

The correction depth values may be calculated while changing a distance between the reference color and the at least one depth sensor.

The correction depth values may be used to correct a distortion due to a measurement distance and an intensity of a reflected light measured by the at least one depth sensor.

The apparatus may further include a second storage unit to store calibration information used to calibrate a location and a direction of depth images generated by a plurality of depth photography apparatuses, and a calibration unit to calibrate the location and the direction of the depth images based on the stored calibration information so that the depth images are matched with each other.

The calibration information may include location information and direction information of each of the plurality of depth photography apparatuses, the location information and direction information being calculated using a plurality of three-dimensional (3D) points acquired from a brightness image generated by capturing a reference pattern.

The foregoing and/or other aspects are achieved by providing a method of correcting an image, the method including receiving a depth value and a luminous intensity, the depth value and the luminous intensity being measured by at least one depth sensor, reading a correction depth value of a plurality of correction depth values mapped to different depth values and different luminous intensities from an LUT, the correction depth value being mapped to the measured depth value and the measured luminous intensity, and correcting the measured depth value using the read correction depth value.

The reading of the correction depth value may include identifying a correction depth value among the correction depth values, the identified correction depth value being simultaneously mapped to the measured depth value and the measured luminous intensity. The correcting of the measured depth value may include replacing the measured depth value with the identified correction depth value.

The method may further include calibrating a location and a direction of depth images based on calibration information for calibration of the location and the direction of the depth images, the depth images being generated by a plurality of depth photography apparatuses.

The calibration information may include location information and direction information of each of the plurality of depth photography apparatuses, the location information and direction information being calculated using a plurality of 3D points acquired from a brightness image generated by capturing a reference pattern.

The foregoing and/or other aspects are also achieved by providing a method of correcting an image, the method including capturing an object at a predetermined distance and measuring a plurality of luminous intensities and a plurality of depth values, obtaining a relational expression to calculate a depth error corresponding to the predetermined distance using the measured luminous intensities and the measured depth values, calculating a correction depth value to correct a depth value distorted due to the measured luminous intensities and the predetermined distance using the relational expression, and storing the calculated correction depth value.

The method may further include changing the predetermined distance and calculating a correction depth value based on the changed distance.

Additional aspects, features, and/or advantages of example embodiments will be set forth in part in the description which follows and, in part, will be apparent from the description, or may be learned by practice of the disclosure.

According to embodiments, it is possible to correct errors of depth values based on correction depth values stored in the form of a LUT, with great accuracy and reliability. Here, the errors of depth values may occur caused by a measurement distance and an intensity of reflected infrared (IR) light measured by a sensor of a depth photography apparatus.

Correction depth values may be obtained based on a distance between an object and a depth photography apparatus, may be mapped to a plurality of luminous intensities and a plurality of depth values, and may be stored. Thus, it is possible to more accurately and rapidly correct the plurality of depth values.

Also, information used to calibrate a relative location and direction between a plurality of depth photography apparatuses may be stored in advance, and thus it is possible to rapidly calibrate object images captured by different photography apparatuses, and also possible to exactly match the object images with each other.

In a multi-view capturing system where a depth photography apparatus and a color photography apparatus are used, information on a change relationship between the depth photography apparatus and the color photography apparatus may be calculated in advance and the calculated information may be stored, and it is therefore possible to exactly match a 3D shape of an object with color information.

BRIEF DESCRIPTION OF THE DRAWINGS

These and/or other aspects, features, and advantages of at least one example embodiment will become apparent and more readily appreciated from the following description, taken in conjunction with the accompanying drawings of which.

DETAILED DESCRIPTION

Reference will now be made in detail to at least one example embodiment, examples of which are illustrated in the accompanying drawings, wherein like reference numerals refer to the like elements throughout. Example embodiments are described below to explain the present disclosure by referring to the figures.

Figure 1:
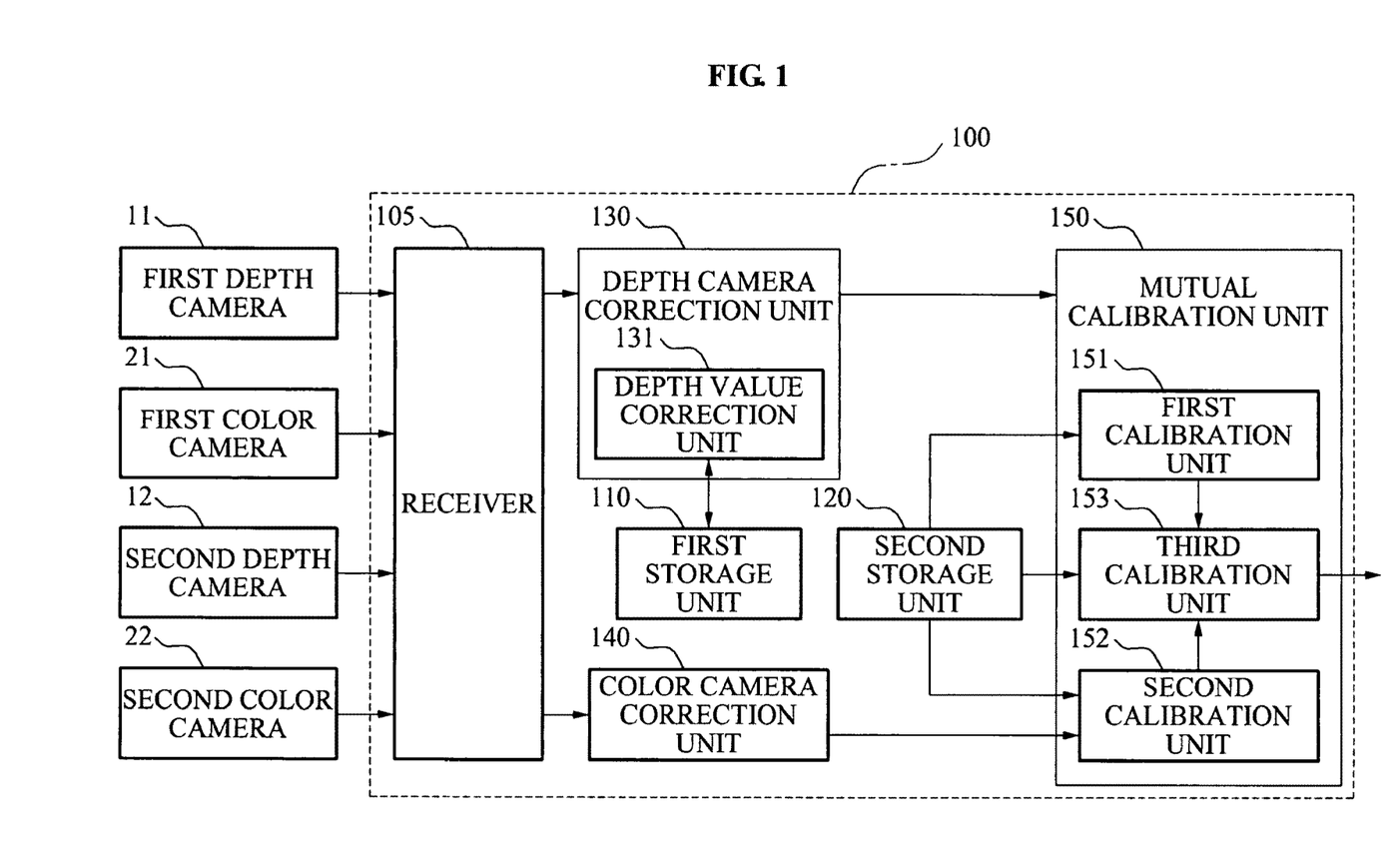
FIG. 1 illustrates a block diagram of an image correction apparatus according to at least one example embodiment.

FIG. 1 illustrates a block diagram of an image correction apparatus 100 according to at least one example embodiment.

The image correction apparatus 100 of FIG. 1 may correct depth values of depth images and depth values of brightness images, and may calibrate a relative location and direction between each of the images. The depth images and brightness images are acquired using a plurality of depth photography apparatuses and a plurality of color photography apparatuses.

To measure a Time of Flight (TOF), a depth photography apparatus may irradiate a light source, such as infrared rays (IR), onto an object, and may detect a light reflected from the object using a depth sensor. The depth photography apparatus may calculate a depth value based on an amount of time taken from a point in time when the light source is irradiated onto the object until the light reflected from the object is detected, and may express an image using the calculated depth value, to thereby obtain a depth image representing the object. The depth value refers to a distance measured between the depth photography apparatus and each point (for example, each pixel) of the object. Hereinafter, the depth photography apparatus is referred to as a depth camera.

The depth camera may measure an intensity of the detected light, and thus may obtain a brightness image representing the intensity of the detected light in addition to the depth image. A luminous intensity refers to a brightness or an intensity of light which is emitted from the depth sensor, reflected from an object and returned to the depth sensor.

A color photography apparatus may generate a color image of an object. The color photography apparatus may be understood as an apparatus capable of capturing colors of an object, for example, a Complementary Metal-Oxide-Semiconductor (CMOS) camera or a Charge-Coupled Device (CCD) camera. Hereinafter, the color photography apparatus is referred to as a color camera.

To obtain a three-dimensional (3D) image, a first depth camera 11 and a second depth camera 12 may capture the same object at different locations, and may thus measure a depth value and a luminous intensity for each pixel of the captured object. A single depth camera and a single color camera may be paired with each other and may be mounted on the same location. In FIG. 1, the first depth camera 11 and the second depth camera 12 are paired with a first color camera 21 and a second color camera 22, respectively.

Referring to FIG. 1, the image correction apparatus 100 may include a receiver 105, a first storage unit 110, a second storage unit 120, a depth camera correction unit 130, a color camera correction unit 140 and a mutual calibration unit 150.

The receiver 105 may receive a depth image and a brightness image which are obtained by the first depth camera 11 and the second depth camera 12, and color images generated by the first color camera 21 and the second color camera 22.

The first storage unit 110 and the second storage unit 120 may be nonvolatile memories to store information used to correct the images acquired by the first depth camera 11 and the second depth camera 12, and the first color camera 21 and the second color camera 22.

Specifically, the first storage unit 110 may store correction depth values used to correct a distortion of depth values based on a measurement distance and the depth value, and a luminous intensity measured by the first depth camera 11 and the second depth camera 12. In other words, the correction depth values may be used to correct a distortion of depth values which occurs due to the measurement distance and luminous intensities (for example, IR intensities) measured by depth sensors of the first depth camera 11 and the second depth camera 12.

The first storage unit 110 may store a plurality of correction depth values in the form of a lookup table (LUT), for example, Table 1. The correction depth values may be mapped to different depth information and different luminous intensities. The depth information may refer to a depth value obtained by measuring a reference pattern in advance.

TABLE 1

| INPUT | | OUT |
|---|---|---|
| Measured depth values | Measured luminous intensities | Correction depth values |

Figure 2:
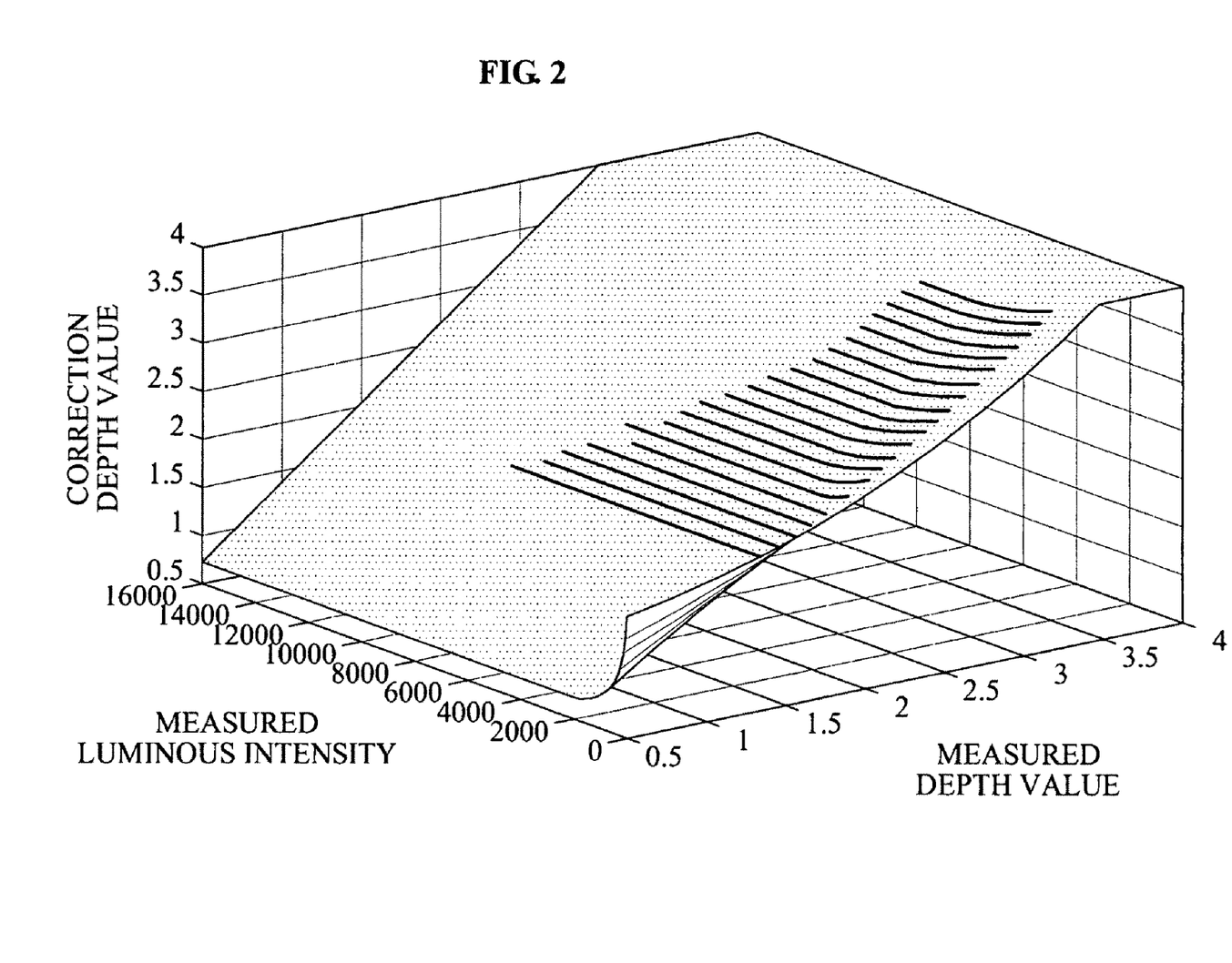
FIG. 2 illustrates a distribution chart of correction depth values stored in a first storage unit of the image correction apparatus of FIG. 1.

Referring to Table 1, the depth values and luminous intensities measured by the first depth camera 11 and the second depth camera 12 may be stored as 'inputs,' and the correction depth values corresponding to the depth values and luminous intensities may be stored as 'outputs.' Table 1 in the form of the LUT is generated from a chart of FIG. 2.

The depth value stored in the LUT may be a measurement distance used in an experiment, or an actually-measured distance. Correction depth values may be generated based on a measurement error, which is a difference between an actual depth value and a measured depth value of a reference color in a reference pattern used in the experiment. The reference color may be a color of a pixel among a plurality of pixels in the reference pattern.

The correction depth values may be calculated while changing a distance between the reference color and the depth camera.

FIG. 2 illustrates a distribution chart of the correction depth values stored in the first storage unit 110 of FIG. 1.

The distribution chart of FIG. 2 shows that actual depth values may vary as measured luminous intensities (for example, IR intensities) change when the same depth value is measured. Hereinafter, an operation of generating an LUT stored in the first storage unit 110 will be described. The LUT may be generated in the manufacture of an image correction apparatus into a product.

An LUT calculation unit (not shown) may compare a measured value (namely, a measured depth value) obtained through the experiment with a reflection value (namely, a luminous intensity) of an actual correction object, may generate an error distribution chart, and may produce a mathematical model for correction based on the generated error distribution chart. The LUT calculation unit may be included in the image correction apparatus 100, or may be implemented as a separate central computer.

Figure 3:
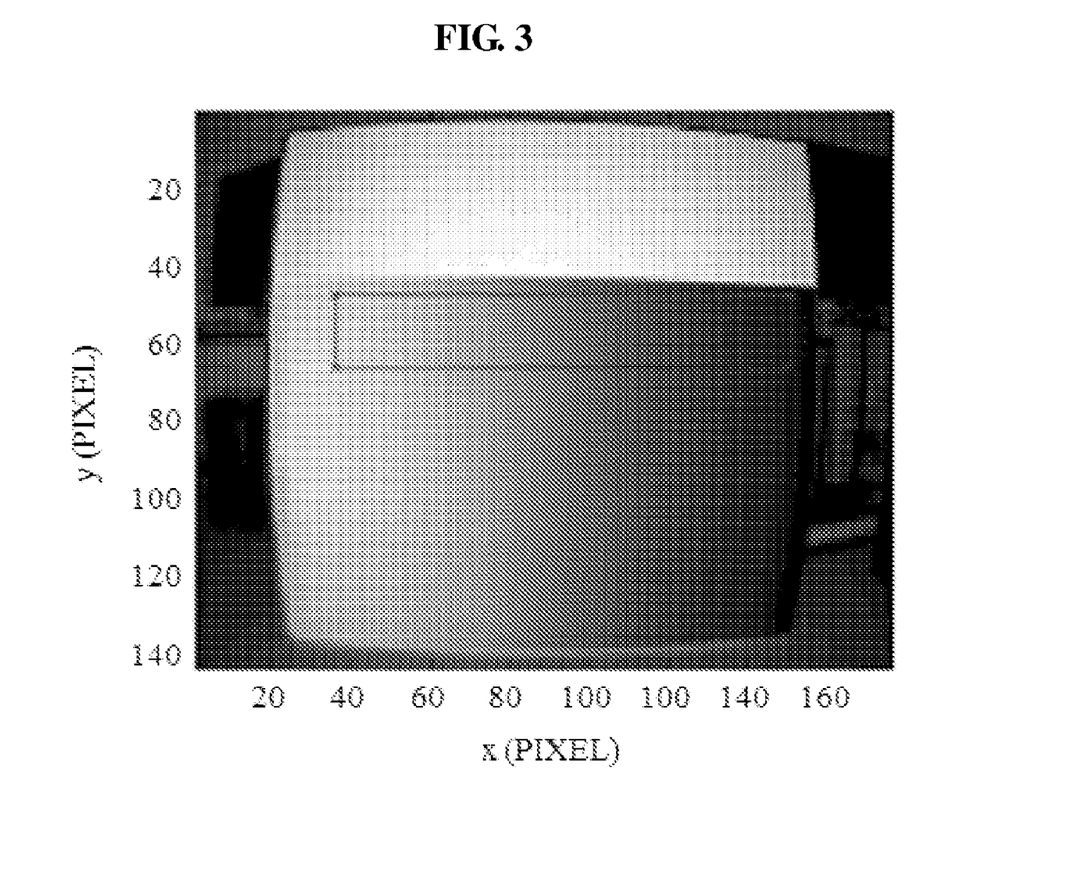
FIG. 3 illustrates an example of a reference pattern used to obtain correction depth values according to at least one example embodiment.

The correction object may be implemented, for example, as a reference pattern, of which a brightness is linearly changed in a horizontal direction as shown in FIG. 3. In FIG. 3, an x-axis and a y-axis represent a brightness of each pixel in the reference pattern.

Figure 4:
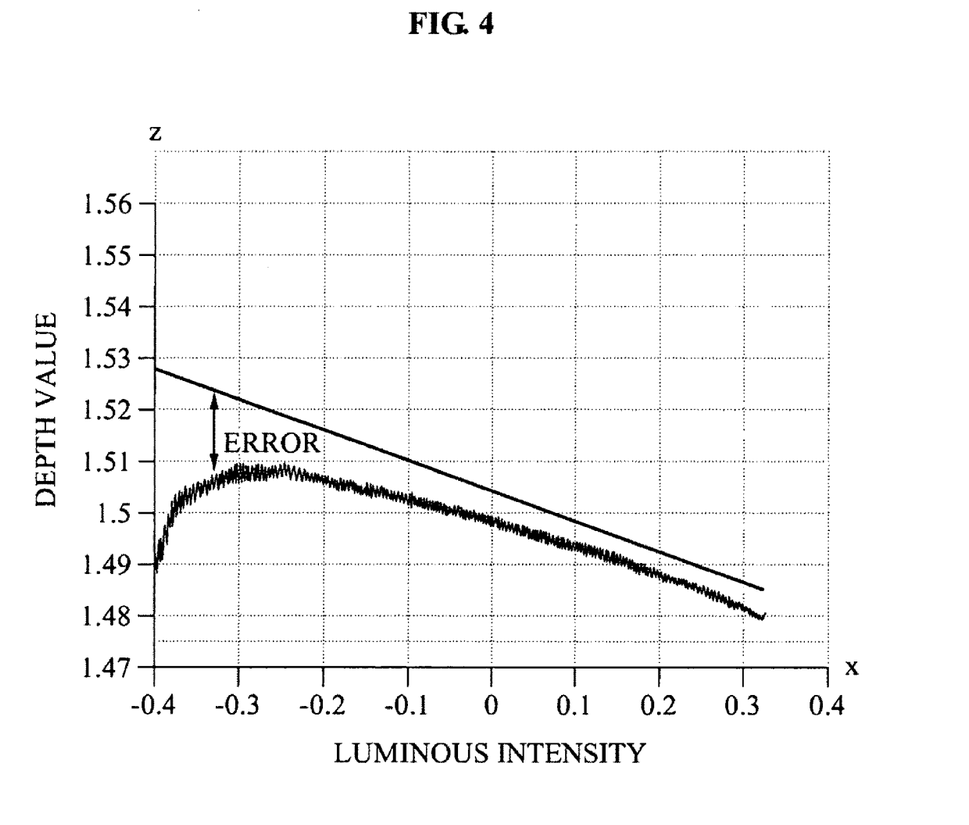
FIG. 4 illustrates a depth error and a depth value measured by capturing the reference pattern of FIG. 3.

FIG. 4 illustrates a depth error obtained by measuring a part of the reference pattern of FIG. 3 using a depth camera. Referring to FIG. 4, a straight line represents an actual distance (namely, an actual depth value) between the reference pattern and the depth camera, and a curved line represents a distance measured between the reference pattern and the depth camera. In this instance, since the actual distance may be set in advance in the experiment, a designer of the experiment may already be aware of the actual distance. Equation 1 shows a mathematical model of a depth error derived based on the distribution chart of FIG. 4, below:

$$E(x) = \frac{\alpha}{\left(\left(\frac{x}{\beta}\right)+\gamma\right)^2} + \delta.$$  [Equation 1]

In Equation 1, x denotes a measured luminous intensity (for example, an IR intensity), E(x) denotes a depth error, and α, β, γ and δ denote constants for a correction function. The LUT calculation unit may substitute the luminous intensities and the depth errors shown in FIG. 4 into Equation 1 several times, to obtain α, β, γ and δ. Since the designer is already aware of the actual distance between the reference pattern and the depth camera, it is possible also to know a depth error due to a difference between the actual distance and a depth value measured at a predetermined distance. Accordingly, the designer may substitute the depth error and a luminous intensity measured at the predetermined distance into Equation 1, to obtain α, β, γ and δ at the predetermined distance. The obtained α, β, γ and δ may be substituted into Equation 1, and thus a relational expression corresponding to the predetermined distance may be generated.

Depending on the example embodiments, α, β, γ and δ may be calculated, and thus it is possible to remove a noise of the depth error E(x) and to efficiently interpolate non-measured distances as described below, using α, β, γ and δ. The non-measured distances are defined as distances demanded to be interpolated.

After α, β, γ and δ are obtained to complete Equation 1, the designer may change a location of the reference pattern by a predetermined distance. The LUT calculation unit may measure a luminous intensity and a depth value of the reference pattern captured by the depth camera at the changed location. Specifically, while changing a distance between the reference pattern and the depth camera, the LUT calculation unit may measure luminous intensities and depth values for each distance, and may compare the measured depth values with the actual distance between the reference pattern and the depth camera. For example, the distance between the reference pattern and the depth camera may be changed by a fixed distance interval, for example, 50 cm or 1 m.

When an actual distance between the reference pattern and the depth camera is 50 cm, the LUT calculation unit already knows the actual distance, 50 cm. Accordingly, the LUT calculation unit may calculate a difference between the actual distance and a depth value of the reference pattern measured at 50 cm, to acquire a depth error. The LUT calculation unit may then substitute the acquired depth error and a luminous intensity measured at 50 cm into Equation 1, to thereby obtain α, β, γ and δ.

Accordingly, a generalized relational expression, such as Equation 1, may be generated to obtain a depth error at 50 cm. According to an example embodiment, the LUT calculation unit may substitute all luminous intensities measured at a predetermined distance into the relational expression such as Equation 1 generated at the predetermined distance, and calculate depth errors for each of the luminous intensities. Also, the LUT calculation unit may add the calculated depth errors and measured depth values, to generate correction depth values.

The designer may again change the distance between the depth camera and the reference pattern, and the LUT calculation unit may generate the relational expression for the changed distance, for example, 1 m, using the above-described method.

Figure 5:
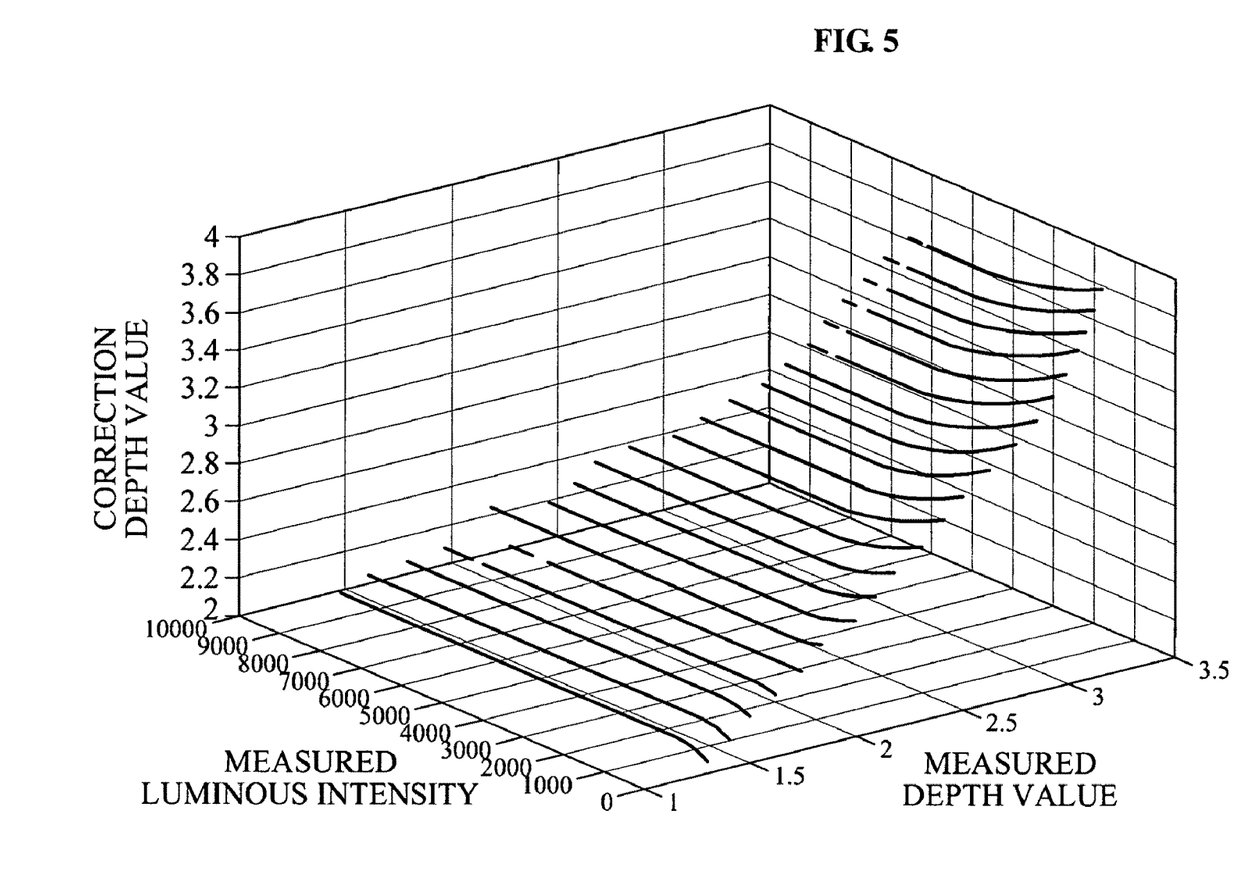
FIG. 5 illustrates correction depth values based on depth values and luminous intensities measured for each distance according to at least one example embodiment.

The above-described method is used to generate a graph as shown in FIG. 5. FIG. 5 illustrates correction depth values based on depth values and luminous intensities measured while changing the distance between the reference pattern and the depth camera.

The LUT calculation unit may calculate constants of Equation 1 for each experimental distance using luminous intensities measured for each experimental distance, and may apply the calculated constants to Equation 1. The LUT calculation unit may also substitute the luminous intensities into Equation 1 to calculate depth errors. Then, the LUT calculation unit may add the calculated depth errors and measured errors, to thereby generate an LUT to display actual depth values, namely correction depth values.

In this instance, interpolation may be performed to acquire a correction depth value corresponding to an unused distance that is a non-measured distance between the reference pattern and the depth camera. FIG. 2 illustrates a result of interpolation based on a distribution chart shown in FIG. 5. Thus, the interpolation may enable correction depth values for each distance to be calculated more simply, without measuring all directions, and to store the calculated correction depth values in the form of an LUT.

A resolution of fields defined in the LUT of the first storage unit 110 may be determined by a user's selection or a designer's selection. The resolution of the fields may be used when the distance between the depth camera and the reference pattern in the experiment is changed. For example, when the distance is changed from 50 cm to 1 m, a resolution of fields may be set to 50 cm (1 m−50 cm=50 cm).

Referring back to FIG. 1, the second storage unit 120 may store calibration information used to calibrate a location and a direction of depth images generated by the first depth camera 11 and the second depth camera 12. In other words, the second storage unit 120 may store calibration information used to perform calibration between a plurality of cameras. Specifically, the second storage unit 120 may store information used to calibrate a location and a direction between the first depth camera 11 and the second depth camera 12, information used to calibrate a location and a direction between the first color camera 21 and the second color camera 22, and information used to correct a distortion caused by optical characteristics of an optical lens. The second storage unit 120 may also store information used to calibrate a relative location and a direction between the first depth camera 11 and the second depth camera 12, and the first color camera 21 and the second color camera 22.

Hereinafter, an operation of calculating calibration information to perform calibration between cameras is described.

According to an example embodiment, a calibration information calculation unit (not shown) may calculate calibration information used to perform calibration between cameras. The calibration information calculation unit may be included in the image correction apparatus 100, or may be implemented as a separate central computer.

The calibration information for the cameras is shown in Table 2 below.

TABLE 2

| | |
|---|---|
| Between depth cameras | Extrinsic constant (for example, a rotation constant and a translation constant) |
| Between color cameras | Intrinsic constant (for example, a focal length) Extrinsic constant (for example, a rotation constant and a translation constant) |
| Between depth cameras and color cameras | Extrinsic constant (for example, a rotation constant and a translation constant) |

Referring to Table 2, the extrinsic constant may be used as the calibration information to calibrate the relative location and the direction between the depth cameras. The extrinsic constant may include a rotation constant that is direction information of a camera, and a translation constant that is location information of a camera. The location information may be calculated from a common reference point used by all cameras.

To perform calibration between color cameras, the intrinsic constant and the extrinsic constant are used. The intrinsic constant refers to information to correct a distortion caused by optical characteristics of the color cameras.

The extrinsic constant may also be used to perform calibration between the depth cameras and the color cameras.

First, an operation of calculating first information used to calibrate the relative location and direction between the depth cameras is described below. Depending on an example embodiment, the depth cameras typically may provide a low-resolution image, and thus a calibration scheme based on a three-dimensional (3D) point may be used to more accurately perform calibration.

Figure 6:
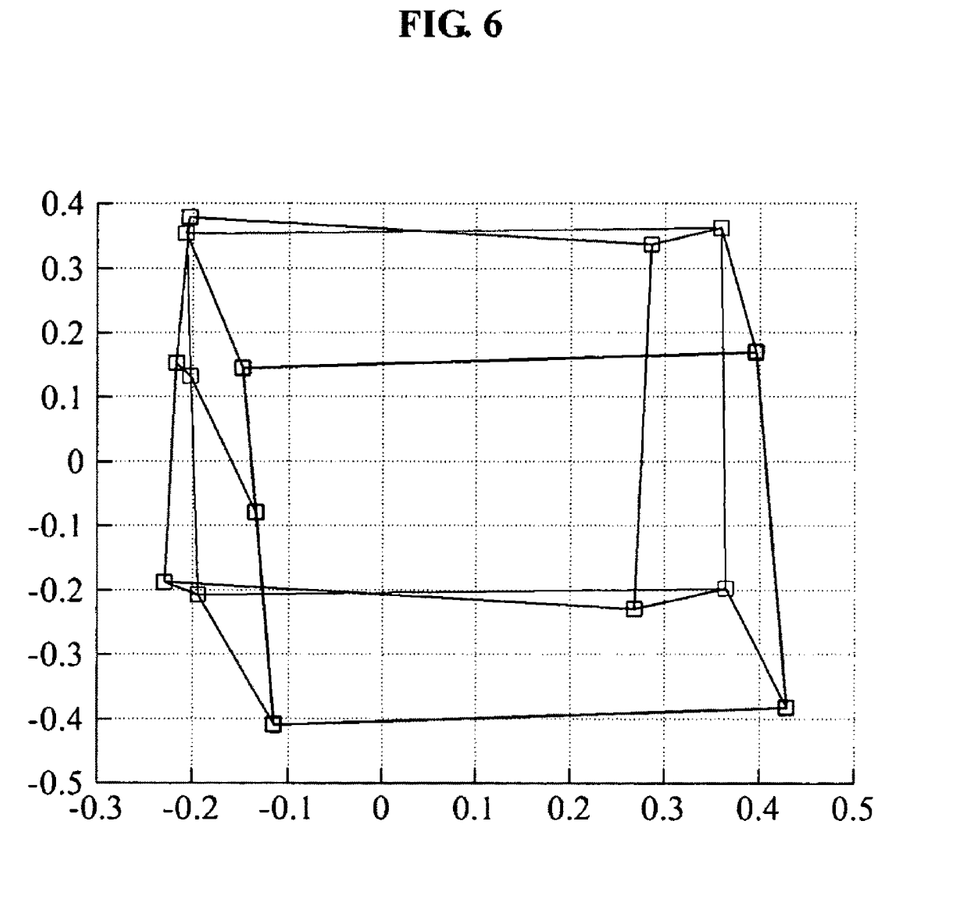
FIG. 6 illustrates 3D points used to calculate calibration information according to at least one example embodiment.

The calibration information calculation unit (not shown) may extract 'n' two-dimensional (2D) points from a 2D amplitude image obtained by capturing in a checkerboard format. The calibration information calculation unit may identify 'n' 3D points corresponding to the extracted 2D points from a stored 3D coordinate table, and may calculate a plane represented by the 3D points as shown in FIG. 6.

Since the 'n' 3D points are placed on a single checkerboard, the calibration information calculation unit may vertically re-project the 3D points onto the plane, to obtain a plane and points stable to noises. Here, re-projection may enable the 3D points to be moved onto the plane. Accordingly, 'n' 3D points may be set for each depth camera, and x, y, z coordinates of each 3D point may differ for each depth camera.

The calibration information calculation unit may select a reference camera from among a plurality of depth cameras, and may calculate rotation constants and translation constants between the reference camera and the other depth cameras using the following Equation 2:

$$p^j = R_{i,j} \cdot p^i + T_{i,j}$$ [Equation 2]

Referring to Equation 2, $p^j$ denotes a 3D point coordinate of a j-th depth camera, $p^i$ denotes a 3D point coordinate of an i-th depth camera, $R_{ij}$ denotes a rotation matrix corresponding to the j-th depth camera at the i-th depth camera, and $T_{ij}$ denotes a translation vector corresponding to the j-th depth camera at the i-th depth camera. The rotation matrix and the translation vector may represent the rotation constant and the translation constant, respectively. Rotation constants and translation constants of all the depth cameras calculated using Equation 2 may be stored in the second storage unit 120.

When the first depth camera 11 and the second depth camera 12 are provided as shown in FIG. 1, and when the first depth camera 11 is set as a reference camera, only information regarding the second depth camera 12 may be calculated as the first information. Alternatively, when three depth cameras are provided, and when one of the three depth cameras is set as a reference camera, information regarding the other two depth cameras may be calculated as the first information.

Second, an operation of calculating second information used to calibrate the relative location and direction between the color cameras is described below.

Color cameras typically provide high-resolution images, without a significant optical distortion. Accordingly, the second information may be calculated using a well-known algorithm. As an example of a well-known algorithm, Bouguet's algorithm developed by Jean-Yves Bouguet (Camera calibration toolbox for MATLAB), may be used to calculate intrinsic constants and extrinsic constants of color cameras using an image of a grating pattern that is a checkerboard. When three color cameras are provided, two intrinsic constants and two extrinsic constants may be calculated as the second information.

Third, an operation of calculating third information used to calibrate the relative location and direction between the depth cameras and the color cameras is described below. The third information may also be calculated using the well-known Bouguet's algorithm or other various techniques. For example, points on a grating pattern may be observed in an amplitude image generated by a color camera and a depth camera, and thus the third information may be calculated to perform switching between the two cameras. When three depth cameras and three color cameras are provided, the number of calculated third information is 3.

The first information, the second information and the third information calculated as described above may be stored in the second storage unit 120.

Referring back to FIG. 1, the depth camera correction unit 130 may correct depth images measured by the first depth camera 11 and the second depth camera 12.

A depth value correction unit 131 may correct the distortion due to the measurement distance and the luminous intensities measured by the first depth camera 11 and the second depth camera 12. Specifically, after receiving from the receiver 105 the depth values and luminous intensities measured by the first depth camera 11 and the second depth camera 12, the depth value correction unit 131 may identify a correction depth value from the LUT stored in the first storage unit 110. Here, the identified correction depth value may be simultaneously mapped to the measured depth value and the measured luminous intensity. The depth value correction unit 131 may replace the measured depth value with the identified correction depth value, to correct the distortion of the measured depth value.

The depth camera correction unit 130 may correct noises of the depth sensors occurring over time, a distortion occurring due to a pixel location of a brightness image, and a distortion caused by optical characteristics of optical lenses, through temporal filtering.

When the correction operation is performed as described above, the depth camera correction unit 130 may provide the mutual calibration unit 150 with the corrected depth images. The depth camera correction unit 130 may correct depth values of depth images measured by other depth cameras in the same manner as described above, and may then provide the mutual calibration unit 150 with corrected depth images.

The color camera correction unit 140 may correct the color images received from the receiver 105 through a color quantization. The color camera correction unit 140 may provide the mutual calibration unit 150 with color images corrected for each of the color cameras 21 and 22.

The mutual calibration unit 150 may perform calibration between the first depth camera 11 and the second depth camera 12, and the first color camera 21 and the second color camera 22, or may compensate for optical characteristics of the first depth camera 11 and the second depth camera 12, and the first color camera 21 and the second color camera 22. The mutual calibration unit 150 may include a first calibration unit 151, a second calibration unit 152 and a third calibration unit 153.

The first calibration unit 151 may calibrate the location and the direction of the depth images based on the stored calibration information so that the depth images may be matched with each other. Specifically, the first calibration unit 151 may calibrate the relative location and direction between the first depth camera 11 and the second depth camera 12 based on the first information stored in the second storage unit 120.

While the first depth camera 11 and the second depth camera 12 are illustrated in FIG. 1, three depth cameras, a first depth camera, a second depth camera and a third depth camera, may be provided. In this instance, the first to third depth cameras may capture the same object to obtain a first depth image, a second depth image and a third depth image, respectively. When the first depth camera mounted between the second depth camera and the third depth camera is set as a reference camera, the first information includes an extrinsic constant of the second depth camera and an extrinsic constant of the third depth camera.

The first calibration unit 151 may reflect the stored extrinsic constant of the second depth camera on the second depth image, and may calibrate a location and a direction of the second depth image. Likewise, the first calibration unit 151 may calibrate a location and a direction of the third depth image by reflecting the stored extrinsic constant of the third depth camera on the third depth image. In this instance, the extrinsic constant of the second depth camera and the extrinsic constant of the third depth camera may include, for example, a rotation matrix and a translation vector.

The second calibration unit 152 may calibrate the relative location and direction between the color cameras 21 and 22 based on the second information stored in the second storage unit 120, and may correct the distortion caused by optical characteristics.

The third calibration unit 153 may calibrate the relative location and direction between the first depth camera 11 and the second depth camera 12, and the first color camera 21 and the second color camera 22, based on the third information stored in the second storage unit 120, and may correct the distortion caused by optical characteristics. The third calibration unit 153 may change the location and the direction between the first depth camera 11 and the second depth camera 12, and the first color camera 21 and the second color camera 22, based on the third information. Herein, the first depth camera 11 and the second depth camera 12 correspond to the first color camera 21 and the second color camera 22, respectively. For example, the third calibration unit 153 may use the rotation matrix and the translation vector to change an axis of the first color camera 21 to an axis of the first depth camera 11 or to change the axis of the first depth camera 11 to the axis of the first color camera 21. Thus, it is possible to exactly match a 3D shape of an object with color information.

Each of the depth images and color images, of which the optical characteristics, location and direction are corrected by the mutual calibration unit 150, may be generated as a 3D image through a rendering operation.

Hereinafter, an image correction method will be described with reference to FIG. 7.

Figure 7:
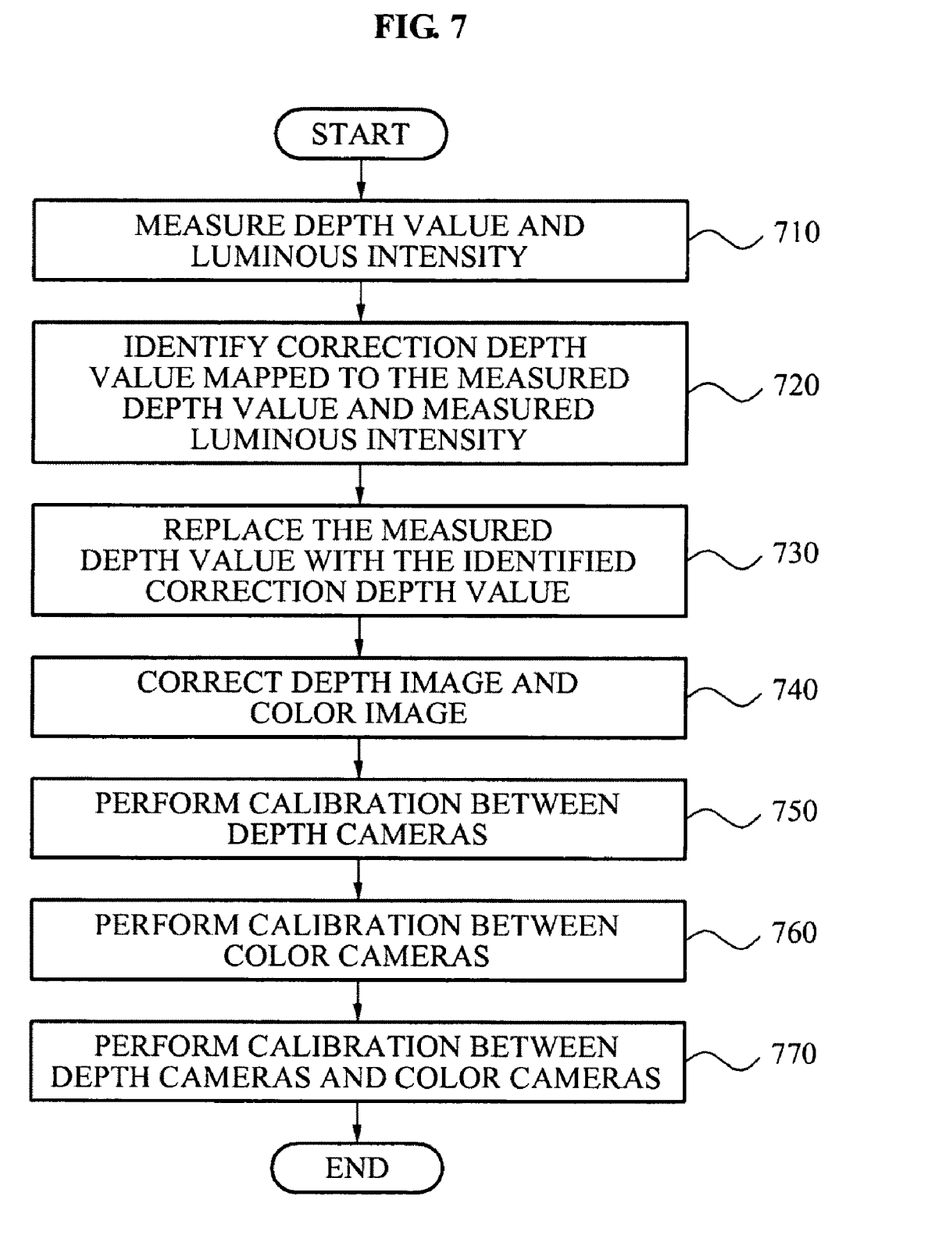
FIG. 7 illustrates a flowchart of an image correction method according to at least one example embodiment.

FIG. 7 illustrates a flowchart of an image correction method according to at least one example embodiment.

Referring to FIG. 7, in operation 710, each of the first depth camera 11 and the second depth camera 12 may capture an image of an object to measure a depth value and a luminous intensity, and each of the first color camera 21 and the second color camera 22 may capture an image of an object to generate a color image. Here, an image with the measured depth values is referred to as a depth image, and an image with the measured luminous intensities is referred to as a brightness image.

In operation 720, after receiving from the receiver 105 the depth values and luminous intensities measured by the first depth camera 11 and the second depth camera 12, the depth value correction unit 131 may identify a correction depth value from the LUT. Here, the identified correction depth value may be simultaneously mapped to the measured depth value and the measured luminous intensity.

In operation 730, the depth value correction unit 131 may replace the depth value measured in operation 710 with the correction depth value identified in operation 720, to correct the distortion of the measured depth value.

In operation 740, the depth camera correction unit 130 may correct noises of the depth sensors occurring over time, a distortion occurring due to a pixel location of a brightness image, and a distortion caused by optical characteristics of optical lenses. In operation 740, the color camera correction unit 140 may correct color images generated by the first color camera 21 and the second color camera 22 through the color quantization.

In operation 750, the first calibration unit 151 may calibrate the relative location and the direction between the first depth camera 11 and the second depth camera 12 based on the first information stored in the second storage unit 120. The first information may include the location information (namely, the translation vector) and the direction information (namely, the rotation matrix) of the first depth camera 11 and the second depth camera 12. The first calibration unit 151 may calibrate the location and direction of the depth images captured by the first depth camera 11 and the second depth camera 12 based on the first information, so that the depth images may be matched with each other.

In operation 760, the second calibration unit 152 may calibrate the relative location and the direction between the first color camera 21 and the second color camera 22 based on the second information stored in the second storage unit 120, and may correct the distortion caused by optical characteristics.

In operation 770, the third calibration unit 153 may calibrate the relative location and the direction between the first depth camera 11 and the second depth camera 12, and the first color camera 21 and the second color camera 22, based on the third information stored in the second storage unit 120, and may correct the distortion caused by optical characteristics.

Each of the images corrected using the above-described method may be generated as a 3D image through the rendering operation.

Figure 8:
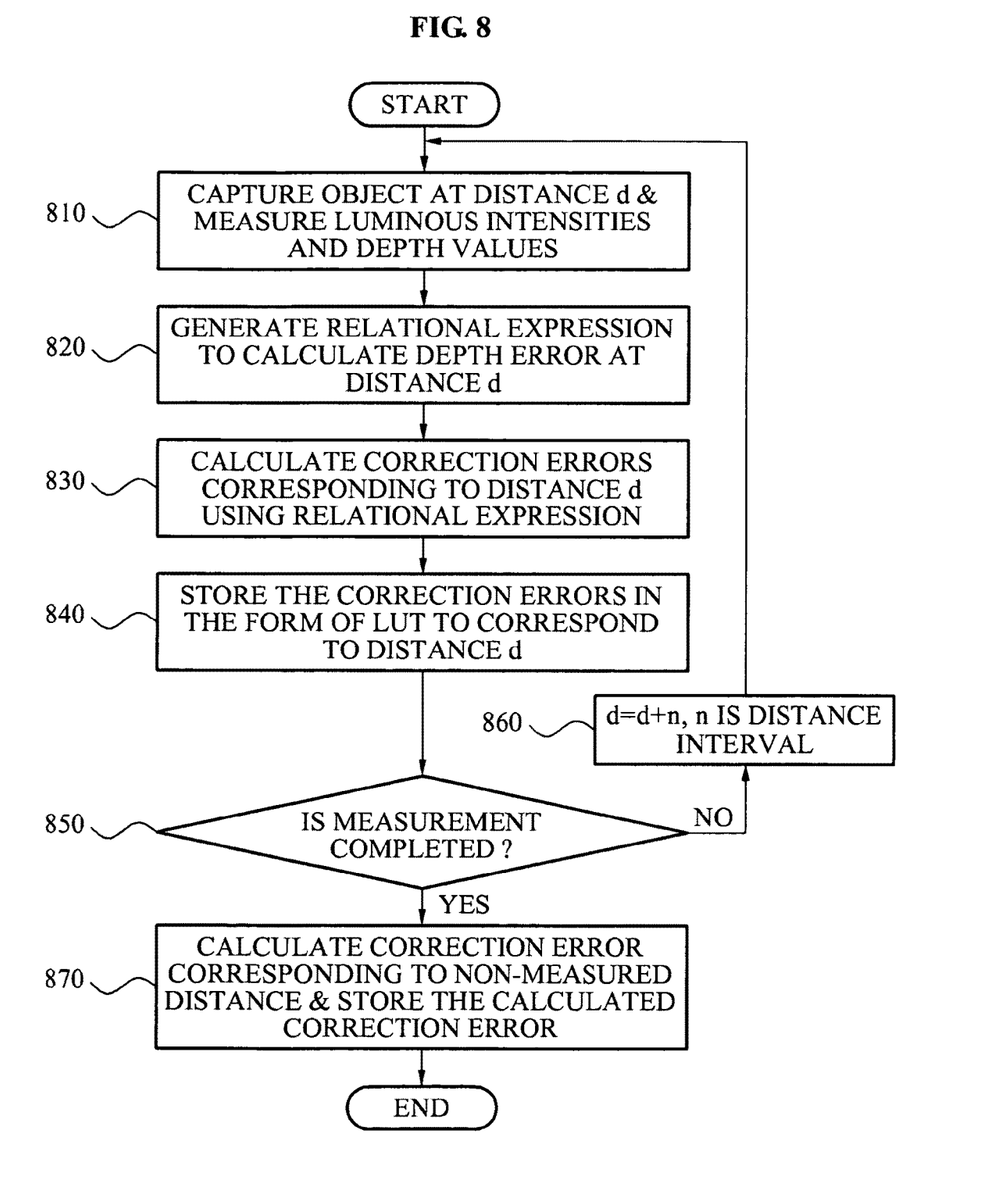
FIG. 8 illustrates a flowchart of a method of calculating a correction depth value according to at least one example embodiment.

FIG. 8 illustrates a flowchart of a method of calculating a correction depth value according to at least one example embodiment.

Referring to FIG. 8, in operation 810, a depth camera may capture an image of an object, such as a reference pattern shown in FIG. 3, at a distance d, and may measure luminous intensities and depth values for each pixel of an object image. The distance d means a distance between the depth camera and the object, and a designer is already aware of the distance d.

In operation 820, to calculate a depth error at the distance d, a relational expression, such as Equation 1, may be generated based on the depth values and luminous intensities measured in operation 810.

In operation 830, correction errors corresponding to the distance d may be calculated using the relational expression generated in operation 820.

In operation 840, the calculated correction errors may be stored in the form of an LUT to correspond to the distance d. In this instance, the correction errors may correspond to the depth values and luminous intensities measured in operation 810.

When a measurement, that is, the generating of correction errors, is not completed in operation 850, the designer may change the distance d by a fixed distance interval n in operation 860.

The depth camera may capture the reference pattern at the distance changed in operation 860, and the LUT calculation unit (not shown) may calculate a correction error corresponding to the changed distance through operations 810 to 840. Thus, a distribution chart may be generated as shown in FIG. 5.

When the measurement is completed in operation 850, the LUT calculation unit may interpolate a non-measured distance, may calculate a correction error corresponding to the interpolated distance, and may store the calculated correction error so that the correction error may correspond to the interpolated distance in operation 870. Accordingly, the first storage unit 110 may store the LUT, which contains the measured luminous intensities and the measured depth values as inputs and the correction depth values as outputs.

Figure 9:
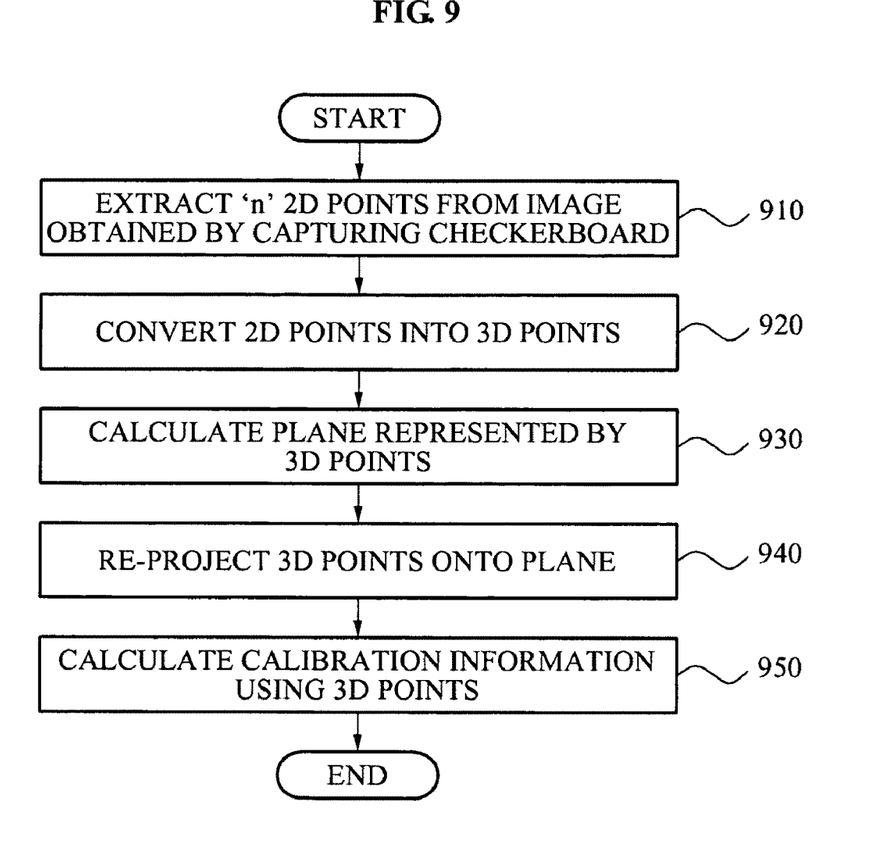
FIG. 9 illustrates a flowchart of a method of calculating information used to perform calibration between depth cameras according to at least one example embodiment.

FIG. 9 illustrates a flowchart of a method of calculating information used to perform calibration between depth cameras according to at least one example embodiment.

Referring to FIG. 9, in operation 910, the calibration information calculation unit (not shown) may extract 'n' two-dimensional (2D) points from a 2D amplitude image obtained by capturing a checkerboard.

In operation 920, the calibration information calculation unit may convert the extracted 2D points into 3D points. Typically, a depth image captured by a depth camera has x, y, z coordinates, namely 3D points, for each pixel. Accordingly, the calibration information calculation unit may identify coordinates corresponding to the extracted 2D points from the depth image, and may convert the 2D points into 3D points using the x coordinates among the identified coordinates.

In operation 930, the calibration information calculation unit may calculate a plane represented by the n 3D points as shown in FIG. 6.

In operation 940, the calibration information calculation unit may re-project the 3D points onto the calculated plane, to remove noises.

In operation 950, the calibration information calculation unit may calculate calibration information used to perform calibration between depth cameras, using Equation 2. The calibration information may include a rotation constant and a translation constant. The rotation constant may correspond to direction information of a camera and may be represented by a matrix. The translation constant may correspond to location information of a camera and may be represented by a vector.

The calibration information calculated in operation 950 may be stored in the second storage unit 120, and may be actually used in calibration between depth cameras.

The methods according to the above-described example embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable storage or recording media include magnetic media, such as hard disks, floppy disks, and magnetic tape; optical media, such as CD ROM disks and DVDs; magneto-optical media, such as optical disks; and hardware devices that are specially configured to store and perform program instructions, such as read-only memory (ROM), random access memory (RAM), flash memory, and the like. Other computer-readable media may be transfer media, such as optical lines, metal lines, or waveguides including a carrier wave to transmit a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. The above-described non-transfer media are non-transitory.

Although at least one example embodiment has been shown and described, the present disclosure is not limited to the described at least one example embodiment. Instead, it would be appreciated by those skilled in the art that changes may be made to these example embodiments without departing from the principles and spirit of the disclosure, the scope of which is defined by the claims and their equivalents.

What is claimed is:

1. An apparatus to correct an image, the apparatus comprising:
a receiver to receive a depth value and a luminous intensity, the depth value and the luminous intensity being measured by at least one depth sensor;
a first storage unit to store a plurality of correction depth values mapped to different depth values and different luminous intensities;
a correction unit to read one of the correction depth values from the first storage unit and to correct the measured depth value using the read correction depth value, the correction depth value being mapped to the measured depth value and the measured luminous intensity; and
a calibration unit to calibrate location and direction information of depth images generated by a plurality of depth photography apparatuses to match the depth images with each other,
wherein the stored plurality of correction depth values includes interpolated correction depth values corresponding to non-measured distances between the at least one depth sensor and a reference pattern, and
wherein the calibration unit performs calibration between the plurality of depth photography apparatuses by selecting a depth photography apparatus from among the plurality of depth photography apparatuses as a reference depth photography apparatus, and calculating rotation constants and translation constants between the reference depth photography apparatus and remaining plurality of depth photography apparatuses.

2. The apparatus according to claim 1, wherein the correction unit identifies a correction depth value from among the stored correction depth values, and replaces the measured depth value with the identified correction depth value, the identified correction depth value being simultaneously mapped to the measured depth value and the measured luminous intensity.

3. The apparatus according to claim 1, wherein the correction depth values are generated based on a measurement error, the measurement error being a difference between an actual depth value of a reference color and a measured depth value of the reference color.

4. The apparatus according to claim 3, wherein the correction depth values are calculated while changing a distance between the reference color and the at least one depth sensor.

5. The apparatus according to claim 1, wherein the correction depth values are used to correct a distortion due to a measurement distance and an intensity of a reflected light measured by the at least one depth sensor.

6. The apparatus according to claim 1, further comprising:
a second storage unit to store calibration information used to calibrate the location and the direction of depth images generated by the plurality of depth photography apparatuses; and
the calibration unit calibrates the location and the direction of the depth images based on the stored calibration information.

7. The apparatus according to claim 6, wherein the calibration information includes location information and direction information of each of the plurality of depth photography apparatuses, the location information and the direction information being calculated using a plurality of three-dimensional (3D) points acquired from a brightness image generated by capturing a reference pattern.

8. A method of correcting an image, the method comprising:
receiving a depth value and a luminous intensity, the depth value and the luminous intensity being measured by at least one depth sensor;
reading one of a plurality of correction depth values from a lookup table (LUT) storing the plurality of correction depth values mapped to different depth values and different luminous intensities, the read correction depth value being mapped to the measured depth value and the measured luminous intensity;
correcting the measured depth value using the read correction depth value;
calibrating a location and a direction of depth images generated by a plurality of depth photography apparatuses; and
performing calibration between the plurality of depth photography apparatuses by selecting a depth photography apparatus from among the plurality of depth photography apparatuses as a reference depth photography apparatus, and calculating rotation constants and translation constants between the reference depth photography apparatus and remaining plurality of depth photography apparatuses,
wherein the LUT includes interpolated correction depth values corresponding to non-measured distances between the at least one depth sensor and a reference pattern.

9. The method according to claim 8, wherein the reading of the correction depth value comprises identifying a correction depth value among the correction depth values, the identified correction depth value being simultaneously mapped to the measured depth value and the measured luminous intensity, and
the correcting of the measured depth value comprises replacing the measured depth value with the identified correction depth value.

10. The method according to claim 8, wherein the correction depth values are generated based on a measurement error, the measurement error being a difference between an actual depth value of a reference color and a measured depth value of the reference color.

11. The method according to claim 10, wherein the correction depth values are calculated while changing a distance between the reference color and the depth sensor.

12. The method according to claim 8, wherein the correction depth values are used to correct a distortion due to a measurement distance and an intensity of a reflected light measured by the at least one depth sensor.

13. The method according to claim 8, wherein the calibration information comprises location information and direction information of each of the plurality of depth photography apparatuses, the location information and the direction information being calculated using a plurality of three-dimensional (3D) points acquired from a brightness image generated by capturing a reference pattern.

14. A method of correcting an image, the method comprising:
- capturing an image of an object at a predetermined distance and measuring a plurality of luminous intensities and a plurality of depth values;
- obtaining a relational expression to calculate a depth error corresponding to the predetermined distance, using the measured luminous intensities and the measured depth values;
- calculating a correction depth value to correct a depth value distorted due to the measured luminous intensities and the predetermined distance, using the relational expression; and
- storing the calculated correction depth value;
- calibrating a location and a direction of depth images generated by a plurality of depth photography apparatuses; and
- performing calibration between the plurality of depth photography apparatuses by selecting a depth photography apparatus from among the plurality of depth photography apparatuses as a reference depth photography apparatus, and calculating rotation constants and translation constants between the reference depth photography apparatus and remaining plurality of depth photography apparatuses,
- wherein the storing the calculated correction depth value further comprises storing at least one interpolated correction depth value corresponding to at least one non-measured distance.

15. The method according to claim 14, further comprising changing the predetermined distance and calculating a correction depth value based on the changed distance.

16. A non-transitory computer readable recording medium storing a program to cause a computer to implement the method of claim 8.

* * * * *